United States Patent
Steinhäusler et al.

(10) Patent No.: US 6,767,950 B2
(45) Date of Patent: Jul. 27, 2004

(54) PIGMENTED, WEATHERABLE MOLDING COMPOSITIONS

(75) Inventors: Thomas Steinhäusler, Collierville, TN (US); Robert M. Walrath, Valparaiso, IN (US); John J. Young, Valparaiso, IN (US); Thomas J. Folda, Collierville, TN (US); Mark S. Harber, Collierville, TN (US)

(73) Assignee: AOC, L.L.C., Collierville, TN (US)

( * ) Notice: Subject to any disclaimer, the term of this patent is extended or adjusted under 35 U.S.C. 154(b) by 0 days.

(21) Appl. No.: 09/778,052

(22) Filed: Feb. 6, 2001

(65) Prior Publication Data

US 2002/0151630 A1 Oct. 17, 2002

(51) Int. Cl.$^7$ .............................. C08K 3/22; C08L 67/00

(52) U.S. Cl. .................. 524/430; 524/495; 525/49; 525/48; 525/935

(58) Field of Search ............................. 524/430, 437, 524/441, 442, 445, 449, 451, 492, 493, 494, 495; 525/48, 49, 935

(56) References Cited

U.S. PATENT DOCUMENTS

| | | | |
|---|---|---|---|
| 3,947,422 A | | 3/1976 | Tatum et al. |
| 4,009,225 A | | 2/1977 | Maxel |
| 5,094,797 A | | 3/1992 | Heel et al. |
| 5,326,516 A | | 7/1994 | Brannon |
| 5,443,775 A | | 8/1995 | Brannon |
| 5,747,553 A | | 5/1998 | Guzauskas |
| 5,747,607 A | * | 5/1998 | Hager et al. ................. 525/445 |
| 5,948,849 A | | 9/1999 | Porter |
| 6,040,045 A | * | 3/2000 | Alfonso et al. ............. 428/327 |

FOREIGN PATENT DOCUMENTS

| | | |
|---|---|---|
| EP | 0 272 127 | 6/1988 |
| EP | 0 572 851 | 12/1993 |

* cited by examiner

Primary Examiner—Katarzyna Wyrozebski
(74) Attorney, Agent, or Firm—Baker, Donelson, Bearman, Caldwell & Berkowitz

(57) ABSTRACT

Pigmented molding compositions having good weatherability for sheet and bulk molded articles are made by mixing a resin component comprising an unsaturated polyester, a monomer which will react with the polyester and a non-aromatic, thermoplastic polymer; an ultraviolet light absorbing material and/or a hindered amine light stabilizing material; a pigment; and a reinforcing agent.

20 Claims, No Drawings

US 6,767,950 B2

PIGMENTED, WEATHERABLE MOLDING COMPOSITIONS

TECHNICAL FIELD

This invention relates to pigmented molding compositions. In a more specific aspect, this invention relates to pigmented molding compositions which have good weatherability. This invention also relates to a process for the manufacture of these compositions.

BACKGROUND OF THE INVENTION

Molding compositions have been manufactured and used for many years in forming various articles. Examples of these compositions include sheet molding compounds (SMC) and bulk molding compounds (BMC).

In many instances, pigments are added to molding compositions to achieve particular effects. These pigments are commonly added in either pure form or in the form of a dispersion (also referred to as a pigment paste). A typical pigment paste comprises pigment particles dispersed in a suitable carrier resin. Examples of suitable carrier resins are unsaturated polyesters having a low viscosity, such as described in U.S. Pat. No. 4,009,225, and polystyrene resins having oxazoline groups, such as described in European Patent Publication No. 272,127.

Pigment pastes are frequently used because of the difficulty under normal manufacturing conditions of dispersing pigment particles in a uniform manner into other substances, such as directly into molding compositions.

The prior art in this industry contains many disclosures of molding compositions and the improvements obtained with these compositions. For example, U.S. Pat. No. 5,326,516 describes a method of preparing a cured pigmented thermosetting polymer molding composition which exhibits improved color value and reduced haze. Styrene is described as an effective monomer, and the pigment is mixed into a thermoplastic polymer that has a similar refractive index to the thermosetting polymer.

U.S. Pat. No. 5,443,775 describes a process for preparing thermoplastic polymer compositions and low shrinking thermosetting resin molding compositions.

European Patent Publication No. 0 572 851 describes formulations for sheet molding compounds in which the resin component contains an unsaturated polyester resin, a thermoplastic polymer (such as polyethylene) and an acrylic monomer. Calcium carbonate is disclosed as a filler. However, these formulations are made with beads or powder extruded from a melt containing both the unsaturated polyester resin and a polyethylene-based low profile additive.

European Patent Publication No. 0 783 026 describes the use of an end-capped unsaturated polyester resin in monomer-free sheet and bulk molding compounds. Thermoplastic polymers may be present in these compositions.

U.S. Pat. No. 5,747,553 describes low pressure acrylic molding compositions reinforced with fibers. This patent discloses resins with acrylic backbones for dental applications. Silica, feldspar and quartz are disclosed as fillers.

U.S. Pat. No. 5,948,849 describes top-coat weatherable systems for stained composite thermosetting or thermoplastic surface building products.

One problem which is continually encountered by the prior art pigmented molding compositions is that of weatherability. (The term "weatherability" as used in this application refers to the stability of a molded article to environmental factors, such as humidity, ultraviolet radiation, temperature, etc.) As will be recognized by those having skill in this art, the pigmented molded articles with good weatherability have distinct advantages over equivalent articles but which lack good weatherability.

For various reasons, the prior art pigmented molding compositions fail to provide articles having the weatherability which is desired and even essential for many uses. Thus, there is a need in the industry for pigmented molding compositions which have good weatherability.

SUMMARY OF THE INVENTION

Briefly described, the present invention provides pigmented, weatherable molding compositions for sheet and bulk molded articles. The present invention also provides a process for the manufacture of these compositions.

As will be seen in greater detail below, the pigmented molding compositions of this invention provide articles with good weatherability. These articles do not need to be clear-coated or painted to achieve good weatherability.

Accordingly, an object of this invention is to provide a pigmented molding composition for sheet molding applications.

Another object of this invention is to provide a pigmented molding composition for bulk molding applications.

Another object of this invention is to provide a pigmented, weatherable molding composition for sheet molding applications.

Another object of this invention is to provide a pigmented, weatherable molding composition for bulk molding applications.

Still another object of this invention is to provide a pigmented, weatherable molded sheet having improved gloss and color retention when exposed to environmental conditions such as humidity, ultraviolet radiation and temperature.

Still another object of this invention is to provide a pigmented, weatherable molded bulk part having improved gloss and color retention when exposed to environmental conditions such as humidity, ultraviolet radiation and temperature.

Yet still another object of this invention is to provide a process for the manufacture of a pigmented molding composition having good weatherability.

Yet still another object of this invention is to provide a process for the manufacture of a pigmented molding composition having good weatherability and which is useful in sheet molding and bulk molding applications.

These and other objects, features and advantages of this invention will become apparent from the following detailed description.

DETAILED DESCRIPTION OF THE INVENTION

The present invention relates to a pigmented, weatherable molding composition comprising a resin component which comprises an unsaturated polyester, a monomer which will react with the polyester and a non-aromatic, thermoplastic polymer; an ultraviolet light absorbing material and/or a hindered amine light stabilizing material; a pigment; and a reinforcing agent.

The present invention also relates to a process for the manufacture of a pigmented, weatherable molding composition, wherein process comprises the steps of mixing a resin component which comprises an unsaturated polyester, a monomer which will react with the polyester and a non-aromatic, thermoplastic polymer; an ultraviolet light absorbing material and/or a hindered amine light stabilizing material; a pigment; and a reinforcing agent.

The molding compositions of this invention can be molded into various articles, including sheets and bulk parts, such as automotive bumpers, truck beds, fenders, etc.

The molding compositions of this invention have good weatherability because they resist the damaging effects of humidity, ultraviolet radiation and temperature. By having good weatherability, the molding compositions of this invention are prime candidates for various molded-in-color applications.

For purpose of this application, good weatherability (which may also be referred to as environmental stability) is determined by gloss and color retention. Gloss readings are taken at 20, 60 and 85 degrees and averaged from about 5 readings. In this industry, the gloss at the 60 degree reading is generally reported in weather testing. As a direct result of having good weatherability, the articles made from the molding compositions of this invention are not required to be clear-coated and/or painted, which are common practices in this industry.

The molding compositions of this invention have good weatherability due to the careful selection of the components which are contained in these compositions. The unsaturated part of the resin component does not contain a significant amount of any aromatic compounds such as orthophthalic acid, isophthalic acid, terephthalic acid, etc. which are well known to cause yellowing when exposed to sunlight for long periods of time. Preferably, the resin component does not contain any aromatic compounds.

As noted above, the molding compositions of this invention contain a resin component which comprises an unsaturated polyester, a monomer which will react with the polyester and a non-aromatic, thermoplastic polymer.

The unsaturated polyesters useful in the resin component are well-known commercially available products. These polyesters (sometimes referred to as polyester alkyds) are a class of soluble, linear, low molecular weight materials which contain both carboxylic ester groups and carbon-carbon double bonds as recurring units along the main polymer chain. These polyesters may be prepared by condensation of diols, ethylenically unsaturated dicarboxylic acids or anhydrides to impart the unsaturation and saturated dicarboxylic acids to modify the polymer.

The unsaturated polyesters useful in this invention may be described as solutions of unsaturated polyesters in copolymerizable monomers. Suitable unsaturated polyesters are the usual condensation products of polybasic acids, in particular dibasic carboxylic acids and their esterifiable derivatives such as their anhydrides, which are bonded in the way of an ester with polyhydric alcohols, in particular dihydric alcohols, and which may additionally contain residues of monobasic carboxylic acids or monohydric alcohols, with at least part of the starting materials being provided with ethylenically unsaturated, copolymerizable groups. Preferred unsaturated polyesters are those formed from maleic anhydride and propylene glycol, 1,3-propanediol, 1,4-butanediol, neopentyl glycol, ethylene glycol, diethylene glycol and/or dipropylene glycol.

The monomer used in the resin component can be monofunctional or polyfunctional, but must be in a condition to react with the polyester. Preferred monomers are the mono and polyfunctional acrylate and methacrylate monomers, examples of which are methyl methacrylate, 1,4-butanediol dimethacrylate, 1,6-hexanediol diacrylate, 1,6-hexanediol dimethacrylate and trimethylpropane triacrylate. The monomer can also be comprised of a mixture of two or more monomers. Additionally, depending upon the desired molding compositions of this invention, one of the monomers in a mixture can contain one or more aromatic groups.

A third essential part of the resin component is a non-aromatic, thermoplastic polymer (also referred to as a low profile additive). As with the polyester, these polymers are well-known commercially available products. These non-aromatic polymers are especially useful in producing molded articles having a Class A surface (necessary for molded automotive parts). Many polymers can be used in this invention, including saturated polyesters, vinyl polymers, polymethacrylates and a mixture of such polymers.

In this invention, the thermoplastic polymer is added to control the polymerization shrinkage of the unsaturated polyester. The thermoplastic polymer can be any thermoplastic known to be able to control the polymerization shrinkage of the unsaturated polyester. Suitable thermoplastics are polyolefinic polymers such as polyethylene, acrylic-based polymers such as polymehtylmethacrylate, polyvinyl acetate polymers, saturated polyesters, and/or dual-thickening systems containing isocyanate prepolymers, and combinations thereof. Preferred are saturated polyesters formed from adipic acid (optionally replaced with up to 30 wt. % by other saturated dicarboxylic acids) and 1,3-propanediol, 1,4-butanediol, neopentyl glycol, ethylene glycol, propylene glycol, diethylene glycol and/or dipropylene glycol (optionally replaced up to 30 wt. % by other diols). The molecular weight of the saturated polyesters is preferably between 2,500 and 25,000. Up to 100%, preferably 5 to 40%, of the weight of the saturated polyester may be replaced by other thermoplastics, such as polymethylmethacrylate or polyvinylacetate. The thermoplastic polymer may be used in the form of a solution in the monomer that copolymerizes with the unsaturated polyester.

Suitable pigments for the weatherable molding compositions of this invention are the commercially available organic and inorganic pigments or a mixture of such pigments. The pigment is preferably present in an amount of 2–25 parts per hundred parts of the resin component (phr).

Suitable pigments include phthalocyanine blue, perylene red, pyrazolone yellow, chromium-azo complex red, isoindoline yellow, anthraquinone red, phthalocyanine green, benzimidazolone yellow, quinacridone red, quinacridone violet, diketopyrrolo pyrrol, titanium dioxide, zinc sulphide, iron (III) oxide, chromium (III) oxide, cobalt blue, ultramarine blue, lead chromates, molyldates, bismith vanadate, cadmium selenide, cadmium sulfide and carbon black.

The preferred pigments are those which are not destroyed or damaged under the conditions of free radical polymerization and the molding conditions for thermosetting molding compositions, such as elevated temperature and pressure.

The weatherable molding compositions of this invention also contain an ultraviolet light absorbing material or a hindered amine light stabilizing material. Preferably, both materials are present in these molding compositions. These materials are usually present in an amount up to 2 parts per hundred parts of the resin component.

The molding compositions of this invention also contain a reinforcing agent. Suitable reinforcing agents include inorganic and organic fibers in the form of rovings or sheet like structures. Specific suitable reinforcing agents are made from glass, carbon, cellulose and synthetic organic fibers such as polyethylene, polycarboxylic esters, polycarbonates and polyamides. Two or more reinforcing agents can be used. The reinforcing agent is preferably present in an amount of 20–60% of the molding composition.

There are other materials which can be used in the molding compositions of the present invention, such as inhibitors, catalysts, mold release agents, thickeners and viscosity reducers. The use of these optional materials will depend upon the components of the molding composition, the desired molded end product, etc. Each of the optional materials will be present, if used, in an amount up to 5 parts per hundred parts of the resin component.

Another optional additive for this invention is a filler material. Suitable fillers are alumina trihydrate, alumina powder, aluminosilicate, barium sulfate, calcium carbonate, calcium silicate, calcium sulfate, clay, dolomite, glass spheres, limestone dust, mica, quartz powder, crushed silica, feldspar, talc or a mixture of two or more of such filler materials. The filler, if used, is preferably present in an amount up to 260 parts per hundred parts of the resin component.

Suitable inhibitors are phenolic compounds such as (substituted) hydroquinone, pyrocatechol, t-butylpyrocatechol and ring-substituted pyrocatechols; quinones such as benzoquinone, naphthoquinone and chloranil; nitrobenzenes such as m-dinitrobenzene and thiodiphenylamine; N-nitroso compounds such as N-nitrosodiphenylamine; and salts of N-nitroso-N-cyclohexylhydroxylamine; and mixtures thereof.

Suitable thickeners are oxides or hydroxides of lithium, magnesium, calcium, aluminium or titanium. Preferred thickeners are magnesium oxide and magnesium hydroxide.

Other possible additives are lubricants, such as zinc stearate, magnesium stearate and calcium stearate; and polyalkylene ether waxes; paraffins; curing accelerants such as octoates or naphthenates of copper, lead, calcium, magnesium, cerium, manganese and cobalt; and thickening accelerants such as water and polyols.

The molding compositions of the prior art may be made by the following two general procedures:

Standard Procedure

The resin, low profile additives, monomer and catalyst (and other additives such as viscosity reducers, inhibitors, etc.) are mixed at low shear usually for 2–10 minutes. The mold release agent and fillers are added and mixed until the temperature reaches a range of 27° C. (80° F.) to 32° C. (90° F.) depending on the formulation. A thickener is then added and mixed for 1–5 minutes. This paste is pumped or poured onto the SMC machine and chopped glass fibers are added. These fibers can range in size from 12.5 mm (0.5 inch) to 50 mm (2 inch). The most common chopped glass fiber size is 25 mm (1 inch). The glass content of the formulation can vary from 10% to 60% depending on the application. After the addition of the chopped glass, the compounds are matured to molding viscosity (usually $10 \times 10^6$ to $60 \times 10^6$ cps). The compounds typically reach molding viscosity within 24 to 72 hours. The rate of increase in viscosity can be controlled both by the storage temperature and by the level of thickener added.

Standard Molded-In-Color Procedure

The above-described Standard Procedure is used, except the ultraviolet stabilizers are added to the resin/low profile additive/monomer portion, and the pigment or pigment paste is added with the mold release and filler. The pigment(s) can be added with the resin, low profile additives, monomer, etc. at low shear.

Present Invention Procedure

The above-described Standard Procedure is used, except the ultraviolet stable pigment is added to the resin/low profile additive/monomer portion and mixed at high shear to ensure good pigment dispersion. The ultraviolet stabilizers are then added. The mold release agent and fillers are then added.

The present invention is further illustrated by the following examples which are illustrative of certain embodiments designed to teach those of ordinary skill in the art how to practice this invention and to represent the best mode contemplated for carrying out this invention.

The abbreviations are defined as follows in Examples 1–4:

MA=maleic anhydride
PG=propylene glycol
AA=adipic acid
EG=ethylene glycol
DEG=diethylene glycol
1,4-BDDMA=1,4-butanediol dimethacrylate
BHT=t-butylhydroxy toluene
NV=non volatiles
t-BPB=t-butyl peroxy benzoate
ZnSt=zinc stearate
NPG=neopentyl glycol
Tinuvin 123=a hindered amine light stabilizer
Tinuvin 400=a phenyl triazine ultraviolet light absorber
Byk-9010=a viscosity reducer
PVAc=polyvinyl acetate
CaSt=calcium stearate
OPA=orthophthalic acid
ATH=alumina trihydrate
MgO=magnesium oxide
Notes: Tinuvin 123 and Tinuvin 400 are available from Ciba Specialty Chemicals, Tarrytown, N.Y. Tinuvin is a trademark of Ciba Specialty Chemicals.

Byk-9010 is available from Byk Chemie USA, Wallingford, Conn. Byk is a trademark of Byk Chemie USA.

EXAMPLE 1

A pigmented molding composition is prepared using the above-described Present Invention Procedure and the following materials:

| Material | phr | grams |
| --- | --- | --- |
| MA/PG (60% in 1,4-BDDMA) | 58.00 | 3060.0 |
| AA/EG/DEG (55% in 1,4-BDDMA) | 18.00 | 846.0 |
| PVAc (30% in 1,4-BDDMA) | 24.00 | 1416.0 |
| BHT | 0.03 | 1.8 |
| t-BPB | 1.50 | 90.0 |
| CaSt | 4.50 | 270.0 |
| Carbon Black (15% NV in carrier resin) | 13.33 | 798.0 |
| ATH | 120.00 | 7200.0 |
| Tinuvin ® 400 | 0.50 | 30.0 |
| Tinuvin ® 123 | 0.50 | 30.0 |
| MgO | 2.20 | 132.0 |

EXAMPLE 2

A pigmented molding composition is prepared using the above-described Present Invention Procedure and the following materials:

| Material | phr | grams |
|---|---|---|
| MA/PG (60% in 1,4-BDDMA) | 58.00 | 3120.0 |
| PVAc (30% in 1,4-BDDMA) | 42.00 | 2202.0 |
| BHT | 0.03 | 1.8 |
| t-BPB | 1.50 | 90.0 |
| CaSt | 4.50 | 270.0 |
| Carbon Black (15% NV in carrier resin) | 13.33 | 798.0 |
| ATH | 120.00 | 7200.0 |
| Tinuvin ® 400 | 0.50 | 30.0 |
| Tinuvin ® 123 | 0.50 | 30.0 |
| MgO | 2.20 | 132.0 |

EXAMPLE 3

A pigmented molding composition is prepared using the above-described Present Invention Procedure and the following materials:

| Material | phr | grams |
|---|---|---|
| MA/EG/NPG (70% in 1,4-BDDMA) | 68.00 | 2720.0 |
| AA/EG/NPG (70% in 1,4-BDDMA) | 11.00 | 440.0 |
| PVAc (30% in 1,4-BDDMA) | 21.00 | 840.0 |
| BHT | 0.08 | 3.2 |
| t-BPB | 1.30 | 52.0 |
| ZnSt | 4.80 | 192.0 |
| Carbon Black | 8.00 | 320.0 |
| Byk-9010 | 1.50 | 60.0 |
| Tinuvin ® 400 | 1.00 | 40.0 |
| Tinuvin ® 123 | 1.00 | 40.0 |
| MgO | 3.60 | 144.0 |

EXAMPLE 4

For comparison, a pigmented molding composition is prepared using the above-described Standard Procedure and the following materials:

| Material | phr | grams |
|---|---|---|
| OPA/MA/PG (70% in styrene) | 58.00 | 3060.0 |
| AA/EG/DEG (70% in styrene) | 18.00 | 846.00 |
| PVAc (30% in styrene) | 24.00 | 1416.0 |
| BHT | 0.03 | 1.8 |
| t-BPB | 1.50 | 90.0 |
| CaSt | 4.50 | 270.0 |
| Carbon Black (15% NV in carrier resin) | 13.33 | 798.0 |
| ATH | 25.00 | 1500.0 |
| Tinuvin ® 400 | 0.50 | 30.0 |
| Tinuvin ® 123 | 0.50 | 30.0 |
| MgO | 2.20 | 132.0 |

The compositions made in Examples 1–4 are tested for gloss retention (readings on DCI SF 600 plus Spectrophotometer), and the results are shown in Table 1. The composition containing aromatic compounds (Example 4) shows a significant loss of gloss when compared to the gloss retention values for the compositions which do not contain aromatic compounds.

TABLE 1

(60% Gloss Readings)

| Exposure Energy (KJ/m$^2$): | 0 | 625 | 1250 | 2500 |
|---|---|---|---|---|
| Example 1 | 61.9 | 45.6 | 38.9 | 15.9 |
| Example 2 | 66.3 | 59.2 | 48.7 | 38.7 |
| Example 3 | 62.1 | 60.7 | 56.2 | 50.0 |
| Example 4 | 63.9 | 32.2 | 2.8 | 1.4 |

The compositions made in Examples 1–4 are tested for color retention (readings on DCI SF600 plus Spectrophotometer), and the results are shown in Table 2. The composition containing aromatic compounds (Example 4) shows a significant loss of color when compared to the color retention values for the compositions which do not contain aromatic compounds.

TABLE 2

(Delta E values after exposure at Exterior Automotive SAE-J1960)

| Exposure Energy (KJ/m$^2$): | 0 | 625 | 1250 | 2500 |
|---|---|---|---|---|
| Example 1 | | 3.77 | 3.94 | 7.32 |
| Example 2 | | 2.53 | 1.95 | 7.13 |
| Example 3 | | 1.19 | 1.56 | 2.06 |
| Example 4 | | 9.21 | 10.28 | 11.86 |

The compositions made in Examples 1 and 2 are tested for shrinkage, and the results are shown in Table 3.

TABLE 3

(Shrink measurements on 12 × 12 inch panels using 24% by weight 1 inch glass fibers.)

| | Average | Shrink (mils/in) | Shrink % |
|---|---|---|---|
| Example 1 | 12.003 | 0.22 | 0.02 |
| Example 2 | 11.994 | 0.96 | 0.10 |
| Example 3 | 11.998 | 0.36 | 0.03 |
| Example 4 | 11.997 | 0.42 | 0 04 |

The present invention has been described in detail with particular reference to certain embodiments, but variations and modifications can be made without departing from the spirit and scope of the invention as defined in the following claims.

What is claimed is:

1. A pigmented, weatherable molding composition comprising:
   A. a resin component which comprises an unsaturated polyester; a monomer which will react with the polyester; and a non-aromatic, thermoplastic polymer, wherein the monomer contains a mono or polyfunctional acrylate or a mono or polyfunctional methacrylate monomer;
   B. an ultraviolet light absorbing material or a hindered amine light stabilizing material;
   C. a pigment; and
   D. a reinforcing agent.

2. A pigmented, weatherable molding composition as defined by claim 1 wherein the molding composition contains a filler material.

3. A pigmented, weatherable molding composition as defined by claim 2 wherein the filler material is a non-chalking filler material.

4. A pigmented, weatherable molding composition as defined by claim 2 wherein the filler material is alumina trihydrate, alumina powder, aluminosilicate, barium sulfate, calcium carbonate, calcium silicate, calcium sulfate, clay, dolomite, glass spheres, limestone dust, mica, quartz powder, crushed silica, feldspar, talc or a mixture of two or more of such filler materials.

5. A pigmented, weatherable molding composition as defined by claim 2 wherein the filler material is alumina trihydrate.

6. A pigmented, weatherable molding composition as defined by claim 1 wherein the reinforcing agent is glass fibers.

7. A pigmented, weatherable molding composition as defined by claim 1 wherein the reinforcing agent is carbon fibers.

8. A pigmented, weatherable molding composition as defined by claim 1 wherein the pigment is carbon black.

9. A pigmented, weatherable molding composition as defined by claim 1 wherein the pigment is carbon black which is present in an amount greater than 4 percent based on the weight of the resin component.

10. A pigmented, weatherable composition as defined by claim 1 wherein the unsaturated polyester is made with a glycol component at least 80 percent of which is ethylene glycol and neopentyl glycol.

11. A process for the manufacture of a pigmented, weatherable molding composition, wherein the process comprises the steps of mixing:

A. a resin component which comprises an unsaturated polyester; a monomer which will react with the polyester; and a non-aromatic, thermoplastic polymer, wherein the monomer contains a mono or polyfunctional acrylate or a mono or polyfunctional methacrylate monomer;

B. an ultraviolet light absorbing material or a hindered amine light stabilizing material;

C. a pigment; and

D. a reinforcing agent.

12. A process as defined by claim 11 wherein the molding composition contains a filler material.

13. A process as defined by claim 12 wherein the filler material is a non-chalking filler material.

14. A process as defined by claim 12 wherein the filler material is alumina trihydrate, alumina powder, aluminosilicate, barium sulfate, calcium carbonate, calcium silicate, calcium sulfate, clay, dolomite, glass spheres, limestone dust, mica, quartz powder, crushed silica, feldspar, talc or a mixture of two or more of such filler materials.

15. A process as defined by claim 12 wherein the filler material is alumina trihydrate.

16. A process as defined by claim 11 wherein the reinforcing agent is glass fibers.

17. A process as defined by claim 11 wherein the reinforcing agent is carbon fibers.

18. A process as defined by claim 11 wherein the pigment is carbon black.

19. A process as defined by claim 11 wherein the pigment is carbon black which is present in an amount greater than 4 percent based on the weight of the resin component.

20. A process as defined by claim 11 wherein the unsaturated polyester is made with a glycol component at least 80 percent of which is ethylene glycol and neopentyl glycol.

* * * * *